United States Patent [19]

Koshida et al.

[11] Patent Number: 4,853,196

[45] Date of Patent: Aug. 1, 1989

[54] WATER-SOLUBLE BORON CONTAINING IMPURITY REDUCED HEXAGONALLY CRYSTALLINE BORON NITRIDE AND PROCESS FOR PRODUCTION THEREOF

[75] Inventors: Takahisa Koshida; Ryoji Uchimura, both of Chiba; Takeshi Ogasawara, Tokyo, all of Japan

[73] Assignee: Kawasaki Steel Corp., Japan

[21] Appl. No.: 44,445

[22] Filed: Apr. 30, 1987

[51] Int. Cl.$^4$ .................................... C01B 21/064
[52] U.S. Cl. .................................... 423/290; 501/96; 423/406
[58] Field of Search ............... 423/278, 279, 287, 290, 423/409, 351, 406; 501/96

[56] References Cited

U.S. PATENT DOCUMENTS

| | | | |
|---|---|---|---|
| 3,120,998 | 2/1964 | Mercuri et al. | 423/290 |
| 3,415,625 | 12/1968 | Babl et al. | 423/290 |
| 3,473,894 | 10/1969 | Babl et al. | 423/290 |
| 3,660,027 | 5/1972 | Mandorf et al. | 423/290 |
| 3,734,997 | 5/1973 | Mandorf et al. | 423/290 |
| 4,089,931 | 5/1978 | Sharma et al. | 264/101 |
| 4,107,276 | 8/1978 | Schwetz et al. | 423/290 |
| 4,409,193 | 10/1983 | Sato et al. | 423/290 |
| 4,565,747 | 1/1986 | Nakae et al. | 423/275 |
| 4,634,640 | 1/1987 | Honold et al. | 428/704 |
| 4,784,978 | 11/1988 | Ogasawara et al. | 423/290 |

FOREIGN PATENT DOCUMENTS 2176904 8/1987 Japan .................................... 423/278

*Primary Examiner*—Anthony McFarlane
*Attorney, Agent, or Firm*—Austin R. Miller

[57] ABSTRACT

A hexagonally crystalline boron nitride containing water-soluble boron containing impurities in such a magnitude that the amount of boron contained in an extract after boiling at 100° C. in pure water is less than or equal to 100 μg per gram of boron nitride. In order to purify the boron nitride, a purification process is carried out according to the steps of preparing fine particles of boron nitride powder; dispersing the boron nitride powder in a dispersion medium and stirred for a given period of time for removing water-soluble boron containing impurities; and drying the boron nitride in atmosphere, in which the vapor pressure is maintained lower than or equal to 10 mmHG and/or the process temperature is maintained lower than or equal to 100° C.

17 Claims, No Drawings

WATER-SOLUBLE BORON CONTAINING IMPURITY REDUCED HEXAGONALLY CRYSTALLINE BORON NITRIDE AND PROCESS FOR PRODUCTION THEREOF

BACKGROUND OF THE INVENTION

1. Field of the Invention

The present invention relates generally to a novel and useful high purity boron nitride and production process thereof. More specifically, the invention relates to a hexagonally crystalline boron nitride which is essentially free of water-soluble impurities, particularly water-soluble boron containing impurities. Further particularly, the invention relates to a hexagonally crystalline boron nitride which can be utilized in various fields, such as ceramic industries, cosmetics industries, electric industries, electronic industries, pharmaceutic industries and so forth.

2. Description of the Background Art

Boron nitride is appreciated as a useful material in various industrial fields, because of its good heat conductivity, electric insulation ability, chemical stability, lubrication ability, lubricity, heat resistance and so forth. Hexagonally crystalline carbon nitride generally has a lamellar crystallographically hexagonal structure like that of graphite. In one application, hexagonally crystalline boron nitride powder is used as an additive in synthetic resins, lubricants and so forth or in solid form as jigs, electric insulators, molds and so forth. The demand for high purity hexagonally crystalline boron nitride has increased in recent years.

For example, the Japanese Patent First (unexamined) Publication (Tokkai) No. Showa 54-163398, discloses a synthetic rubber sheet having high heat conductivity and electric insulation ability and production thereof. Boron nitride powder is utilized as an additive for preparing the synthetic rubber. In the disclosure of the above-identified publication, it is suggested that the surface of the particles of the boron nitride power utilized in preparation of the synthetic rubber should be smooth for obtaining better adherence on the synthetic rubber and to provide high heat conductivity and electric insulation ability. In order to provide the latter property, high purity crystalline boron nitride is required.

On the other hand, Japanese Patent Second (examined) Publication (Tokko) No. 58-181708 discloses a process for preparation of a polygonally crystalline boron nitride by high pressure inversion utilizing boron nitride as starting material. A high yield of polygonally crystalline boron nitride cannot be obtained when the boron nitride starting material, contains oxygen. Furthermore, when oxygen is contained in the boron nitride, strength and optical transparency of the obtained polygonally crystalline boron nitride is degraded. In order to avoid these disadvantages, the disclosure of the above-mentioned publication suggests heating the boron nitride at about 2000° C. to 2200° C. to remove impurities including oxygen to obtain high purity boron nitride.

There are three mutually distinct processes for purifying boron nitride in the prior art. A first process has been proposed in the Japanese Patent First Publication (Tokkai) No. Showa 58-60603. In the proposed process, boron nitride is subjected high temperature to vaporize and/or burn away impurities. A second process, proposed in the Japanese Patent First Publication (Tokkai) No. Showa 59-107907 is to wash out impurities with an alkaline solution. In a third process, the high purity boron nitride is obtained by a chemical reaction between boron trichloride and ammonium, according to the following formula $$BCl_3 + NH_3 \rightarrow BN + 2HCl$$

In the aforementioned first process, impurities such as nitric oxide and boron oxide can be vaporized and removed. When the amount of the boron nitride to be treated is small, the vaporized impurities can be removed from the atmosphere by thermal convection and/or diffusion. However, when a relatively large amount of the boron nitride is to be treated creating a relatively large amount of vaporized, decomposed impurities, boron oxide tends to be left in the atmosphere and deposits on the surface of crystalline boron nitride or accumulates between the boron nitride crystallites during the cooling step. Therefore, in processing large amounts of boron nitride, it is not practically possible to satisfactorily remove the impurities in the crystalline boron nitride. Furthermore, since the first process requires high temperatures for removing impurities, it would not be practically applicable in manufacture of high purity boron nitride. Furthermore, even when a small amount of boron nitride is treated for removing oxygen, carbon boron oxide and other impurities, a water-soluble boron compound remains on the surface of the boron nitride crystallites.

In the second process, ions in the alkaline solution are coupled with surface ions of the boron nitride and are retained in the resultant compound. These coupled ions cannot be removed by washing with water. However the resulting high alkalinity of the resultant boron nitride degrades its utility as a material for electronic products. Furthermore, the water-soluble boron compound may not be removed by washing by means of alkaline solutions. The presence of water-soluble boron or boron compounds was proven by the inventor by experimentation. Namely, in the aforementioned Japanese Patent First Publication No. 59-107907, the boron nitride was boiled in water at 100° C. and 200 μg of boron compound was obtained per each 1g of boron nitride.

The third process may provide high purity boron nitride. However, on the other hand, this process does not provide good crystallization of hexagonally crystalline boron nitride. Furthermore, the boron nitride obtained from the third process has relatively poor electric insulation ability and poor heat conductivity and contains a relatively large amount of water-soluble boron compound.

The water-soluble boron containing component in the boron nitride degrades useful properties of the boron nitride and tends to reduce the number of fields in which it can be used. Therefore, in order to enable the boron nitride to be more widely used, it is preferable to minimize the water-soluble boron content component to obtain highly purified boron nitride.

SUMMARY OF THE INVENTION

Therefore, it is an object of the present invention to provide a high purity hexagonally crystalline boron nitride.

Another object of the invention is to provide a boron nitride in which the content of water-soluble boron and/or boron containing compounds is substantially reduced.

A further object of the invention is to provide a process for obtaining the high purity hexagonal crystal boron nitride set forth above.

Boron nitride of the present invention has the property that less than or equal to 100 μg of boron per gram of boron nitride will dissolve when boiled in pure water.

In order to obtain such a high purity of boron nitride in which the content of water-soluble boron and/or boron compounds is minimized, the hexagonal crystal boron nitride power is washed with water having a surface active agent and/or water-soluble organic solvent dispersing agent. After washing, the resultant boron nitride is dried in an atmosphere that is equal to or less than 10 mmHg of vapor pressure and/or of lower than or equal to 100° C.

Generally, the water-soluble boron impurity is an unstable boron oxide. The impurities degrade adherence of the boron nitride to rubber when the boron nitride is used as additive for producing silicon rubber. Furthermore, such impurities degrade properties such as heat resisting ability and electric insulation ability. Therefore, when boron nitride which contains substantially reduced water-soluble boron containing impurities is used as an additive, good adherence of the boron nitride to the rubber can be obtained. Furthermore, silicon rubber produced utilizing boron nitride with a reduced amount of water-soluble, boron containing impurities, exhibits satisfactorily high heat conductivity and electric insulation ability. Also according to the present invention a high yield can be obtained when it is used as starting material for preparation of cubically crystalline boron nitride.

The water-soluble, boron containing impurities content in the boron nitride was measured by the following process.

2.5 g of boron nitride was dispersed in 10 cc of ethyl alcohol. 40 cc of pure water was added to the dispersion to form a slurry. The slurry was put into a flask with a dry distillator. Elution of water-soluble components in the boron nitride is then performed at 100° for 1 hour. The resultant solution is filtered. Ethyl alcohol in the solution is removed by vaporization. Pure water was then added to form 50 cc of solution. The total amount of boron in the solution is determined by crucuminic acid test which has been disclosed in A. Tol and W. A. Tap Talanta, Vol 16, No. 111, published on 1969.

DETAILED DESCRIPTION OF THE INVENTION

The present invention will be herebelow described in detail in terms of the preferred embodiment of the invention, which, however, should not be taken to limit the invention but should be understood to be for explanation and understanding only.

FIRST EMBODIMENT

According to the invention, the starting materials are an oxygen-containing boron compound and a nitrogen compound. Among the various oxygen-containing boron compounds, boric acid is preferred as the boron source in view of reducing the impurities left after reaction. Alternatively dehydrated boric acid, ammonium borate and so forth can be the boron source. The nitrogen compound as the nitrogen source is selected from a group compounds that are readily decomposable and removeable at high temperatures, such as urea, melamine, dicyandiamido cyanuric acid, ammonium chloride and so forth.

In general, the mixing ratio of these starting compounds in the powder mixture should be such that the molar ratio of nitrogen to boron is at least 1 to 1.

As is well know, the crystalline structure of boron nitride is variable depending upon the conditions of synthesis. When boron nitride is synthesized by heating a mixture of boric acid and urea in an atmosphere of nitrogen gas, boron nitride is formed at a reaction temperature higher than or equal to 600° C. While the reaction temperature is held lower than approximately 800° C., the crystalline structure of the boron nitride formed is still not completely hexagonal but is a so-called "turbostratic" crystal in which the adjacent layers are disposed at random positions relative to each other. When the reaction temperatures exceed 800° C., transition of the turbostratic to a hexagonal structure proceeds gradually. Simultaneously with transition of the structure, the boron nitride crystallites grow. During this transition, impurities such as boron oxide, ammonium borate, oxygen, carbon and so forth, are removed to increase the purity of the boron nitride. When the reaction temperature reaches about 1600° C., diameters of the primary particles of crystalline boron nitride reach about 1 μm or greater. When the reaction temperature reaches about 1800° C., the purity of the boron nitride becomes 99% or higher. At this time, the size of the crystalline boron nitride particles grows to a diameter of about 2 μm to 6 μm.

The crystalline structure of boron nitride can be classified according to a method of measurement recommended by the 117th Committee of Japan Society for the Promotion of Science. The crystallite size can be expressed in terms of the average thickness (Lc) thereof in the direction of the c-axis, and the average diameter (La) thereof in the a-axis. Higher accuracy may be obtained when crystallite size is determined by the value of Lc, because the peak for (002) has the highest intensity in the X-ray diffraction diagram.

The crystalline structure of the boron nitride can be evaluated by the value of Lc as a measure. When the Lc is approximately 100 Å, the cyrstalline structure of the boron nitride is turbostratic. When the Lc is in a range of about 100 Å to 400 Å, the crystalline structure becomes partial three dimensional ordering. When the Lc becomes greater than about 400 Å, the crystalline structure becomes complete three dimentional ordering. In addition, the lubrication ability of the boron nitride is low if the Lc is less than 400 Å. Additionally, the relative surface area is measured by way of nitrogen adsorption test. The completely graphitic structure boron nitride had 4 m²/g to 10 m²/g relative surface area and quasi-graphitic structure boron nitride had 25 m²/g to 100 m²/g relative surface area. Between the graphitic crystalline boron nitride and quasi-graphitic crystalline boron nitride, there is substantial difference in hygroscopicity. For instance, the quasi-graphitic boron nitride powder was stored in a polyethylene container for a month. After one month, ammonia vapor was generated due to hydrolysis of the quasi-graphitic boron nitride. Under the same conditions, no ammonia vapor was generated by the graphitic crystalline boron nitride. From this, it has been proven that the graphitic crystalline boron nitride has substantially higher hydrolysis resistance than that of the quasi-graphitic crystalline boron nitride.

Such high hydrolysis resistance is believed to occur for the following reasons:

(1) since the graphitic or hexagonally crystalline boron nitride has a substantially smaller relative surface area than the quasi-graphitic crystalline boron nitride there is less reacting surface area;

(2) boron on the surface of the graphitic crystalline boron nitride is firmly coupled with the internal structure and has substantially great coupling energy so that erosion by vapor may not easily occur;

(3) since a very small amount of hydrophilic substances, such as CO and H are contained in the high purity hexagonally crystalline boron nitride, it has low hydroscopicity.

In view of the above-mentioned properties, the hexagonally crystalline boron nitride is preferred as a starting material for preparing the boron nitride of the present invention. The hexagonally crystalline boron nitride selected as the starting material will be hereafter referred to as "pre-process boron nitride" and the boron nitride of the present invention will be hereafter referred to as "treated boron nitride".

Before the washing stage treatment, the pre-process boron nitride has to be crushed and classified. The pre-process boron nitride particles greater than or equal to 50 μm in diameter are removed. More preferably, pre-process boron nitride particles that are as small as primary particles are used.

In order to effectively wash out water-soluble boron-containing impurities, the boron nitride has to be sufficiently wetable and dispersable. On the other hand, the wash liquid has to be selected to have satisfactory washing characteristics. In general, crystalline boron nitride has poor wettability and dispersion characteristics that are similar to those of graphite. Therefore, in order to provide sufficient wettability and dispersion ability, treatment with a surface active agent and/or dispersion agent is necessary. Experiments have been performed using various surface agents and reagents. As a result of the experiments, it has been found that anion system, noion system, cation system surface active agents or water-soluble organic solvents having hydrophile-Lipophile Balance (HLB) values of 10 to 16 are useful. Therefore, the surface active agent used in the present invention can be selected among, for example:

polyoxyethylene(5)sorbitan monostearate,
polyoxyethylene(4)sorbitan trioleate,
polyoxyethylene glycol 400monooleate,
triethanolamine oleate,
polyethylene glycol 400 monooleate,
triethanolamine oleate,
polyoxyethylene(9)nonylphenol,
polyethylene glycol 400 monolaurate,
polyoxyethylene(4) sorbitan monolaurate.

The preferred concentration of the surface active agent is in a range of 0.001 Wt % to 1 Wt %. When the concentration of the surface active agent exceeds 1 less than 1Wt % can be obtained. Therefore, from the economical viewpoint, the maximum concentration should be limited at 1 Wt %. On the other hand, when the concentration of the surface active agent is less than 0.001 Wt %, the desired dispersion effects cannot be obtained.

On the other hand, as the water-soluble organic solvent may be selected acetone, acetylacetone, ethyl amine, acetaldehyde, phenol, alcohols such as methyl alcohol, ethyl alcohol, glycol, glycerin, and so forth. Preferably, methyl alcohol or ethyl alcohol is selected in view of cost and availability.

For dispersing the boron nitride in the solvent, first the boron nitride is dispersed in the surface active agent and/or the water-soluble organic solvent to form a highly concentrated slurry. Water is added to the slurry. This process requires less surface active agent and/or water-soluble organic solvent and can produce a satisfactory high dispersion. Good dispersion can also be obtained by utilizing a mixture of the surface active agent and the water-soluble organic solvent.

The treatment temperature is in the range of 10° C. to 100° C. When the disperser, i.e., the surface active agent and/or the water-soluble organic solvent has a boiling point lower than 100° C., the treatment temperature is preferably lower than the boiling point of the disperser. On the other hand, in view of the efficiency with which the water-soluble boron and boron containing compounds can be washed out, the treatment temperature has to be higher than or equal to 10° C.

As will be appreciated, a slurry containing a lower concentration of dispersed boron nitride will exhibit higher washing performance. In order to prepare a lower boron nitride concentration slurry, a larger amount of surface active agent and/or water-soluble organic agent is required. This is more expensive due to the amount of solvent. Therefore, in view of cost-vs-performance the maximum allowable boron nitride concentration in the slurry is 50% by weight. When the boron nitride concentration exceeds 50 WT % in the slurry, viscosity of the slurry becomes too high resulting in difficulty in stirring. In addition, such slurry has excessive friction between the stirring impeller wall of the container causing material of the impeller and the wall to enter into the slurry as impurities. On the other hand, in view of cost and drying efficiency, the minimum concentration of the dispersed boron nitride in the slurry should be 2.5% by weight.

The slurry may be stirred with a normal stir, high speed stir, dispersion utilizing shearing force and so forth. The manner of stirring can be selected depending on the type of device used for washing. Furthermore, washing of the boron nitride can be performed by continuous processing or batch processing. The timing of termination the washing operation may be determined so that the content of the water-soluble boron and boron compounds in the resultant boron nitride is at a desired value.

After completing the washing operation, the washed boron nitride is obtained from the slurry by dewatering, using centrifugral dewatering, vacuum dewatering, pressure dewatering or settling. The wet boron nitride is then dried. It is essential not to cause hydrolysis of boron nitride in the drying process. As wil be appreciated, when hydrolysis occurs in the presence of $H_2O$, the boron nitride becomes converted in $B_2O_3$ and $NH_3$ according to the following formula:

$$2BN + 3H_2O \rightarrow B_2O_3 + 2NH_3$$

Hydrolysis of boron nitride may occur when the following conditions are satisfied:

(a) when the vapor pressure of water vapor exceeds 10 mmHg; and (b) when the atmospheric temperature in drying is higher than 100° C.

If the vapor pressure of water vapor is lower than or equal to 10 mmHG, hydrolysis and oxidation of boron nitride according to the following formula:

$$2BN + (3/2)O_2 \rightarrow B_2O_3 + N_2$$

will occur at 500° C. of the temperature of the atmosphere. Therefore, by maintaining the vapor pressure of water vapor lower than or equal to 10 mmHg, drying of boron nitride can be done at a temperature lower than or equal to 500° C. On the other hand, as long as the atmospheric temperature is maintanied at lower than 100° C., hydrolysis will not occur at any vapor pressure of water. The atmospheric temperature to cause hydrolysis is much lower than that to cause oxidation. In order to determine whether liquid water or $H_2O$ vapor caused a greater amount of hydrolysis, two experiments were performed. In one experiment, boron nitride powder was immersed in 100° C. water for 24 hours. In the other experiment, the wet boron nitride obtained from the aforementioned washing process was dried at 100° C. The boron content of water in the former experiment was about 10 $\mu g$ per gram boron nitride, which was less than one-tenth of that in the extract derived from the dried boron nitride. Therefore it wil be understood that $H_2O$ vapor may have a stronger effect on hydrolysis that liquid $H_2O$. In order to reduce the effects of the $H_2O$ vapor, it is preferable to dry the wet boron nitride at a temperature lower than or equal to 100° C. Such relatively low temperature drying can be performed by a freeze-dry process and or an air-dry process. It is preferable when drying the wet borom nitride to maintain the vapor pressure of water lower than or equal to 10 mmHg and to maintain the atmospheric temperature lower than or equal to 100° C.

EXAMPLE 1 through 6

The hexagonally crystalline boron nitride to be purified was crushed by means of a jet-mill. The crushed particles of boron nitride were classified by means of an airflow classifier to obtain a sample of boron nitride particles of 25 $\mu m$ in diameter, having 820 Å of Lc, 99% purity, and 4.5 $m^2/g$ relative surface area.

The obtained sample was dispersed in 10l anion system disperser surface active agent in an ethylene alcohol system which was diluted by ion-exhange liquid to the concentration of 0.5 Wt %. The boron nitride was boiled with the disperser and washed and stirred therein for about 1 hour. After washing the slurry was subjected vacuum filtering to obtain a solid residue. Washing and filtering were repeated 5-times. The last three cycles of the washing operation were performed with pure ion-exhange liquid in order to remove the surface active agent.

After five cycles of washing and filtration a residue was developed on a stainless steel tray. The tray containing the washed boron nitride was put into a vacuum drier and dried under varous conditions as shown in the appended table 1.

In order to check hydrolysis characteristics, the dried boron nitride powder was put into boiling water. After boiling the resultant boron nitride, the boron content of the water was measured. The amounts of boron in the water per 1 g of boron nitride are shown in the table 1.

EXAMPLES 7 THROUGH 11

Boron nitride particles 25 $\mu m$ in diameter, having 820 Å of Lc, 99% purity, and 4.5 $m^2/g$ relative surface area, i.e., identical to those used in the foregoing examples 1 through 6 were used. The particles were washed utilizing ion-exchange water and surface active agents A through E. The surface active agents A through E were prepared by polyoxyethylene 2hepthylundecelethel system materials with mutually different degrees of polymerization. The samples were dispersed in solutions of the surface active agents and the ion-exhange water. Dispersion of the boron nitride powder was performed in the same manner as that in the examples 1 through 6. When ethylene alcohol was used, 1 kg of sample boron nitirde powder was at first dispersed in 2l of ethylene alcohol. After forming dispersion, 8 l of ion-exhange water was added. When the surface active agent was used with ethylene alcohol, the sample was at first dispersed in ethylene alcohol. The solution of surface active agent and ion-exchange water was added thereafter. The washing and filtering of the boron nitride sample were conducted in indential manner to that of the examples 1 through 6.

The washed sample was developed on a stainless steel tray and put in a vacuum drier. The vacuum pressure was set at $10^{-2}$ $T_{orr}$. Drying operation continued for 12 hours. The amounts of boron obtained in the water per 1g of boron nitride were shown in the table 2.

SECOND EMBODIMENT

High crystalline hexagonal boron nitride can be further purified by the second embodiment of the purification process according to the invention. In this embodiment, the material boron nitride is, at first dispersed in a disperser. Water-soluble organic solvent is used as the disperser. In the dispersing process, the particles of the pre-process boron nitride are crushed into fine particles of equivalent size to the primary particles, i.e., particles of about 1 $\mu m$ diameter. The resultant wet boron nitride powder is dried. The dried powder is heat treated for further removing oxygen and carbon.

Similar to the foregoing first embodiment, as the water-soluble organic solvent, acetone, acetylacetone, ethyl amine, acetaldehyde, phenol, alcohols, such as methyl alcohol, ethyl alcohol, gylcol, grycerin, and so forth are preferred. Among the above-listed organic solvents, methyl alcohol or ethyl alcohol are preferred in view of the cost and availability.

Dispersion of the boron nitride powder in the disperser may be assisted by adding a surface active agent. As the surface active agent, nonion system, noion system, cation system surface active agent or water-soluble organic solvent having a hydrophile-Lipophile Balance (HLB) value of 10 to 16 are preferred as the surface active agent for use in the second embodiment of the boron nitride purification process. More particularly, the surface active agent used in the present invention can be selected among, for example:

polyoxyethylene(5)sorbitan monostearate,
polyoxyethylene(4)sorbitan trioleate,
polyoxyethylene gylcol 400monooleate,
triethanolamine oleate,
polyethylene glycol 400 monooleate,
triethanolamine oleate,
polyoxyethylene(9)nonylphenol,
polyethylene glycol 400 monolaurate,
polyoxyethylene(4) sorbitan monolaurate.

The preferred concentration of the surface active agent is in a range of 0.001 Wt % to 1 Wt %. When the concentration of the surface active agent exceeds 1 Wt % higher dispersion efficiency can not be obtained. Therefore, from the economical viewpoint, the maximum concentration is limited at 1 Wt %. On the other hand, when the concentration of the surface active agent is less than 0.001 Wt %, the desired dispersion effect cannot be obtained.

Washing of the boron nitride for removing the boron containing impurities is performed in identical manner and under conditions as set forth with respect to the foregoing first embodiment.

The dried boron nitride from which a substantial amount of boron containing impurity is removed during the washing process, is further treated by the heat treatment process as set forth above. This heat treatment process is performed in order to further remove the water-soluble boron containing impurity which adheres on the outer surface of the boron nitride particles in drying process. Additionally, in the heat treatment process, sodium and other alakaline substance on the surface of the boron nitride crystallite can be removed. Furthermore, in the heat treatment process, oxygen and carbon are contained in the boron nitride crystallite in a form of cyano group compounds. Therefore, it is essential to perform the heat treatment at a temperature sufficiently high to remove the oxygen and carbon. On the other hand, during the heat treatment, the boron nitride should not be oxidized. For this, the heat treatment has to be performed in a non-oxidizing atmosphere. In order to prevent the boron nitride from being oxidized or from causing decomposition, and in order to effectively remove oxygen by reduction, $N_2$, $NH_3$ and $H_2$ atmospheres will be preferred. In addition, oxidation and decomposition of the boron nitride may also be prevented by performing the heat treatment in a vacuum.

In order to determine the optimum temperature for heat treatment, heat treatment experiments were performed at different temperatures. Composition was measured by way of infrared absorption. At the treatment temperature of 1600° C., the amounts of B-N-O and CN groups are reduced. Upper limit of the treatment temperature was the pyrolysis temperature, i.e., 3000° C., in theory. However, since the heat treatment is normally performed in a graphite crucible, carbon is usually generated at treatment temperatures higher than or equal to 2000° C. Therefore, when a graphite crucible is used for the heat treatment, the upper limit of the treatment temperature is lower than 2200° C. When high purity boron nitride crucible is used in combination with a tungsten heater, the upper limit of the treatment temperature can be raised to 2500° C. The process time is variable depending upon the treatment temperature. As will be appreciated, the process time may be shortned by using a higher treatment temperature. Furthermore, the process time may also be variable depending upon the amount of the boron nitride in the crucible.

According to this embodiment, the purified hexagonally crystalline boron nitride will contain less than or equal to 1000 ppm of carbon, less than or equal to 1000 ppm oxygen and less than or equal to 100 ppm water-soluble boron compound.

Such a high purity hexagonally crystalline boron nitride is useful as a material for cosmetics or pharaceutical additives. Also, such boron nitride can be used as a filler material for sintering $Si_3N_4$, AlN or SiC. When the boron nitride produced by the second embodiment of the purification process according to the present invention is used as a filter material, such less oxygen and carbon are generated during the sintering operation. Therefore, a high quality sintered body can be obtained.

EXAMPLES 12 through 16 and COMPARATIVES 6 and 7

Similar to the foregoing examples in the first embodiment, the high purity boron nitride powder was crushed by means of a jet-mill. The crushed particles of boron nitride were classified by means of an airflow classifier to obtain a sample of boron nitride particles of 25 μm in diameter, having 820 Å of Lc, 99% purity, and 4.5 m²/g relative surface area.

The classified boron nitride powder was mixed with ethanol in a ball mill for 30 hours at a mixing ratio of 1 to 5. After this, the ethanol was removed by drying in a drier. Then, the residual boron nitride was crushed into a fine powder. The fine boron nitride powder 5 cm in depth was disposed in a high purity nitride crucible at a bulk density of 0.18 g/cm³. Heat treatment was performed at different temperatures and in various atmospheres experimentally. The carbon, oxygen and water-soluble boron content of the products are shown in the appended table 3.

EXAMPLES 17 through 20

The same sample is washed in a solvent in a ball mill for 30 hours at a 1 to 5 mixing ratio. After washing, the sample was vacuum dried. Then, the boron nitride was crushed into fine powder. The fine boron nitride powder was filled to a depth of 5 cm into a high purity nitride crucible at a bulk density of 0.18 g/cm³. The boron nitride powder in the crucible was subjected to heat treatment at 2000° C., for 2 hours. The result of this experiment is shown in the appended table 4.

As can be seen from the above, high purity and useful hexagonally crystalline boron nitride can be obtained by the process according to the invention.

TABLE 1

| EXAMPLE No. | TEMPERATURE | PRESSURE | TIME | BORON AMOUNT |
|---|---|---|---|---|
| EXAMPLE 1 | 110 | $10^{-2}$ mmHg | 12 h | 4 μg/g-BN |
| EXAMPLE 2 | 110 | 1 mmHg | 12 h | 8 μg/g-BN |
| EXAMPLE 3 | 110 | 10 mmHg | 12 h | 79 μg/g-BN |
| EXAMPLE 4 | 70 | ATMOSPHERIC PRESSURE | 5 days | 67 μg/g-BN |
| EXAMPLE 5 | 100 | ATMOSPHERIC PRESSURE | 24 h | 96 μg/g-BN |
| EXAMPLE 6 | 70 | 1 mmHg | 2 days | 3 μg/g-BN |
| COMPARATIVE 1 | 110 | 15 mmHg | 12 h | 107 μg/g-BN |
| COMPARATIVE 2 | 110 | ATMOSPHERIC PRESSURE | 24 h | 143 μg/g-BN |

TABLE 2

| EXAMPLE No. | DISPERSER | HLB VALUE | CONCENTRATION | BORON AMOUNT |
|---|---|---|---|---|
| EXAMPLE 7 | AGENT A | 13 | 0.2% | 6 μg/g-BN |
| EXAMPLE 8 | AGENT B | 14 | 0.2% | 5 μg/g-BN |
| EXAMPLE 9 | AGENT C | 15 | 0.2% | 7 μg/g-BN |
| EXAMPLE 10 | ETHYL ALCOHOL | — | 20% | 5 μg/g-BN |

TABLE 2-continued

| EXAMPLE No. | DISPERSER | HLB VALUE | CONCENTRATION | BORON AMOUNT |
| --- | --- | --- | --- | --- |
| EXAMPLE 11 | ETHYL ALCOHOL | — | 20% | 3 μg/g-BN |
| | AGENT B | 14 | 0.2% | |
| COMPARATIVE 3 | AGENT D | 17 | 0.2% | 111 μg/g-BN |
| COMPARATIVE 4 | AGENT E | 8 | 0.2% | 134 μg/g-BN |
| COMPARATIVE 5 | — | — | — | 240 μg/g-BN |

TABLE 3

| EXAMPLE No. | TEMPERATURE(°C.) | ATMOSPHERE | TIME(h) | INPURITY CONCENTRATION (PPM) | | |
| --- | --- | --- | --- | --- | --- | --- |
| | | | | 0 | C | B |
| EXAMPLE 12 | 1600 | $N_2$ | 5 | 980 | 830 | 20 |
| EXAMPLE 13 | 1800 | $N_2$ | 3 | 730 | 780 | 18 |
| EXAMPLE 14 | 2000 | $N_2$ | 2 | 680 | 639 | 17 |
| EXAMPLE 15 | 2200 | $N_2$ | 2 | 520 | 740 | 17 |
| EXAMPLE 16 | 1800 | $NH_3$ | 2 | 242 | 350 | 11 |
| COMPARATIVE 6 | 1500 | $N_2$ | 5 | 3870 | 2800 | 350 |
| COMPARATIVE 7 | 2300 | $N_2$ | 2 | 410 | 4100 | 9 |
| HIGH CRYSTALLINE BN FOR HEAT TREATMENT | | | | 4000 | 3000 | 1400 |

TABLE 4

| | SOLVENT | FILTRATION | DRY | IMPURITY CONCENTRATION | | |
| --- | --- | --- | --- | --- | --- | --- |
| | | | | 0 | C | B |
| EXAMPLE 17 | METHANOL | — | 100° C. ATMOSPHERIC PRESSURE | 879 | 300 | 173 |
| EXAMPLE 18 | GLYCEROL | ASPIRATION FILTRATION | 125° C. VACUUM PRESSURE | 680 | 200 | 50 |
| EXAMPLE 19 | SURFACE ACTIVE AGENT (1%) | CENTRIFUGAL FILTRATION | 100° C. VACUUM PRESSURE | 270 | 130 | 18 |
| EXAMPLE 20 | SURFACE ACTIVE AGENT (1%), NaOH (5%) | CENTRIFUGAL FILTRATION | 100° C. VACUUM PRESSURE | 420 | 180 | 7 |

What is claimed is:

1. A method for purifying a hexagonally crystalline boron nitride, comprising the steps of:
   preparing particles of boron nitride powder
   dispersing said boron nitride powder in a dispersion medium and stirring for a given period of time for removing a water-soluble boron containing impurity and
   drying the boron nitride in an atmosphere in which the vapor pressure of water is maintained lower than or equal to 10 mmHG and/or at a process temperature which is maintained lower than or equal to 100° C.

2. A method for purifying the hexagonally crystalline boron nitride as set forth in claim 1, wherein the purified boron nitride contains a reduced amount of a water-soluble boron containing impurity in such a magnitude that the amount of boron containing impurity contained in an extract after boiling at 100° C. in pure water is less than or equal to 100 g per gram of boron nitride.

3. A metod for purifying the hexagonally crystalline boron nitride as set forth in claim 2, wherein said dispersion medium is a solution of a surface active agent, a solution of an organic solvent or a mixture thereof.

4. A method for purifying the hexagonally crystalline boron nitride as set forth in claim 3, wherein said organic solvent is selected from the group consisting of acetone, acetylacetone, ethyl amine, acetaldehyde and other alcohols.

5. A method for purifying the hexagonally crystalline boron nitride as set forth in claim 3, wherein said surface active agent is selected from the group consisting of anionic system surface active agents, nonionic system surface active agents, and cationic system surface active agents.

6. A method for purifying the hexagonally crystalline boron nitride as set forth in claim 5, wherein said surface active agent is selected, from the group consisting of
   polyoxyethylene(5)sorbitan monostearate,
   polyoxyethylene(4)sorbitan trioleate,
   polyoxyethylene glycol 400 monooleate,
   triethanolamine oleate,
   polyethylene glycol 400 monooleate,
   triethanolamine oleate,
   polyoxyethylene(9)nonylphenol,
   polyethylene glycol 400 monolaurate, and
   polyoxyethylene(4)sorbitan monolaurate.

7. A method for purifying the hexagonally crystalline boron nitride as set forth in claim 5, wherein the concentration of the surface active agent is in a range of 0.001 Wt % to 1 Wt %.

8. A method for purifying the hexagonally crystalline boron nitride as set forth in claim 2, wherein said dispersion medium is an organic solvent selected from the group consisting of acetone, acetylacetone, ethyl amine, acetaldehyde, and alcohols.

9. A method for purifying the hexagonally crystalline boron nitride as set forth in claim 2, wherein said dispersion medium is a surface active agent selected from the group consisting of
   polyoxyethylene(5)sorbitan monostearate,
   polyoxyethylene(4)sorbitan trioleate,
   polyoxyethylene glycol 400 monooleate,
   triethanolamine oleate, polyethylene glycol 400 monooleate,
triethanolamine oleate,
polyoxyethylene(9)nonylphenol,
polyethylene glycol 400 monolaurate, and
polyoxyethylene(4)sorbitan monolaurate.

10. A method for purifying the boron nitride as set forth in claim 8, which further comprises the step of heat treating the boron nitride, after said drying, for removing a water-soluble boron containing impurity from the surface of boron nitride crystallite.

11. A method for purifying the hexagonally crystalline boron nitride as set forth in claim 10, wherein said heat treatment is performed at a temperature higher than or equal to 1600° C.

12. A method for purifying the hexagonally crystalline boron nitride as set forth in claim 11, in wherein said hexagonally crystalline boron nitride obtained by said heat treatment contains less than or equal to 1000 ppm of oxygen.

13. A method for purifying the hexagonally crystalline boron nitride as set forth claim 11 in wherein said hexagonally crystalline boron nitride obtained by said heat treatment contains less than or equal to 1000 ppm of carbon.

14. A method for purifying the hexagonally crystalline boron nitride as set forth claim 11 in wherein said hexagonally crystalline boron nitride is in a form of powder.

15. A method for purifying the hexagonally crystalline boron nitride as set forth in claim 11, wherein said hexagonally crystalline boron nitride has an average particle size of about 0.5 to 20 $\mu$m.

16. The method defined in claim 4 wherein said alcohol is phenol.

17. The method defined in claim 8 wherein said alcohol is phenol.

* * * * *